UNITED STATES PATENT OFFICE.

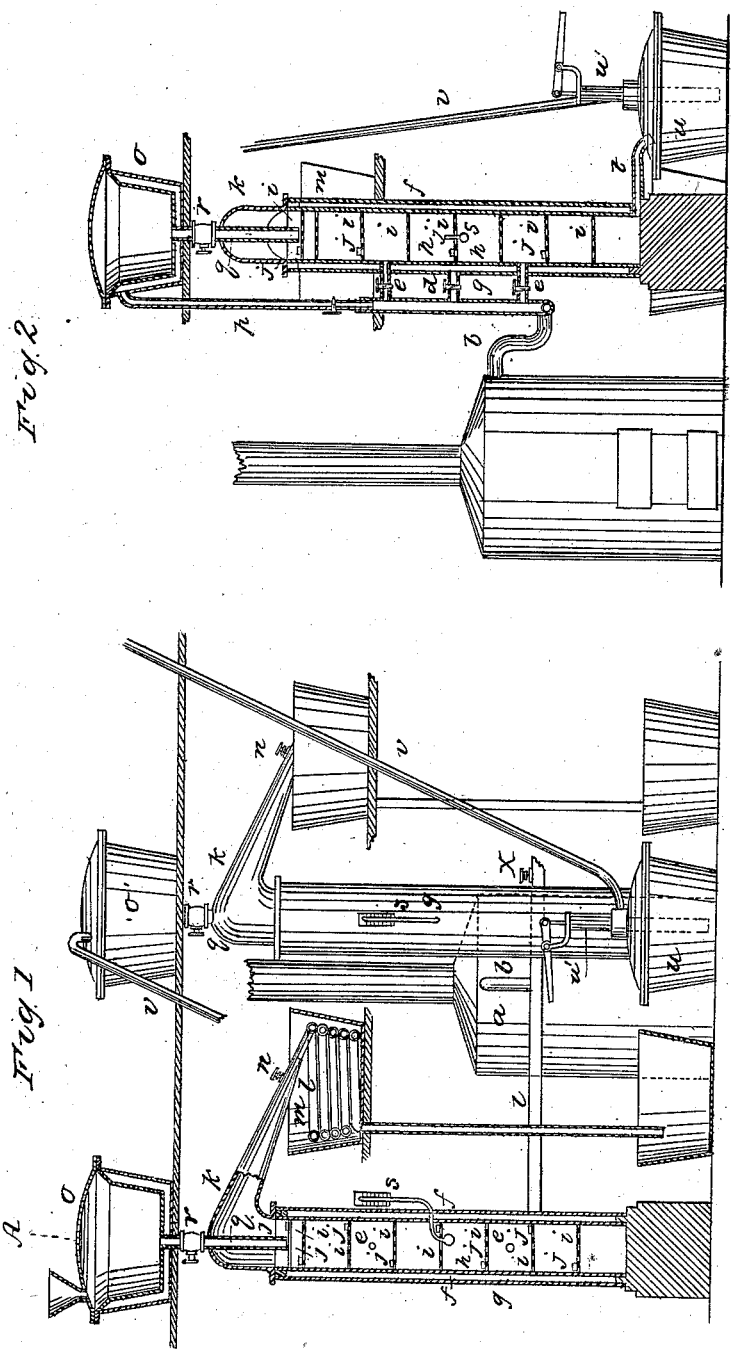

VAN BUREN RYERSON, OF NEW YORK, N. Y.

IMPROVEMENT IN METHODS OF DISTILLATION.

Specification forming part of Letters Patent No. 32,254, dated May 7, 1861.

*To all whom it may concern:*

Be it known that I, VAN BUREN RYERSON, of the city, county, and State of New York, have invented certain new and useful Improvements in Processes of Distillation; and I do hereby declare that the following is a full, clear, and exact description thereof, reference being had to the accompanying drawings, making part of this specification, in which—

Figure 1 is an elevation, partly in section, of the apparatus, and Fig. 2 a vertical section taken at the line A of Fig. 1.

The same letters indicate like parts in all the figures.

The process of distillation generally practiced presents serious difficulties, particularly when applied to the distillation of substances which yield products of different kinds or qualities when the distillation takes place at different degrees of heat. As the heat is applied to the substance in bulk, it is found to be very difficult, if not impossible, so to apply the heat that the substance that is being distilled will be maintained at a uniform temperature. It either goes above or below the required standard, and hence the products are not so pure as if the temperature could be maintained at the same required standard. Another objection is that the application of heat directly or indirectly to the liquid in mass is not economical of fuel. Attempts have been made to overcome these difficulties by interposing between the vessel containing the liquid to be distilled and the fire a bath of melted metal or alloy, or other substance which will liquefy at or near the temperature of the required distillation; and although this insures the distillation at a temperature not below what is required it cannot prevent the temperature being carried too high, and that is usually the source of evil; and, again, it has been attempted to avoid the difficulties by applying the heat by the introduction of superheated steam within the liquid to be distilled; and although in some cases this is an improvement it still falls short of what is desired, and is objectionable on account of the condensation of the steam in the liquid to be distilled.

The object of my invention is to effect the distillation of substances by a mode of operation which admits of maintaining the heat at any desired temperature; and this part of my said invention consists in the application of superheated steam directly to the liquid to be distilled, while such liquid is presented to the steam in a spray or shower, so that the superheated steam acts on the liquid to be distilled while it is in a state of subdivision, so that the heat at which distillation shall take place can be regulated with the greatest nicety by simply regulating the quantity of steam admitted, and as the spray of liquid to be evaporated is only presented in small quantities to the heating action of the superheated steam, and the distillation takes place rapidly, the condensed steam does not mingle with and accumulate in the liquid to be distilled; and the second part of my invention relates to a new mode of fractional distillation to obtain products of different degress—that is to say, products resulting from the distillation of the same substance at different temperatures—and this part of my said invention consists in passing the liquid to be distilled through one division of the apparatus, to be distilled by the superheated steam at one temperature and collecting what is not distilled at that temperature, and passing it in like manner through another division of the apparatus, to be there distilled by the superheated steam under a higher temperature, and so on through any desired number of divisions until all the required products shall have been obtained, the different temperatures being regulated by admitting the steam from one source separately into each division and determining the temperatures by the quantity admitted, or by taking the steam for each division from a separate source.

In the accompanying drawings, $a$ represents a boiler and furnace for generating the steam, which passes from the boiler through a coil of pipe surrounded by heat to be superheated, as the required temperature for distillation is too high to generate the steam directly at such temperature.

The coil of pipe for superheating may be arranged in any of the well-known modes for superheating steam. A steam-pipe, $b$, extends from the superheating-coil, which it is not necessary to represent; and from the main pipe $b$, for each division, there are three (more or less) pipes, $d$ and $e\ e$, each provided with a regulating-valve. The branch pipe *d* is to supply steam to a space, *f*, between two cylinders, *g* and *h*, to prevent the cooling effects of the atmosphere. The quantity of steam for this purpose will be very small, and can be regulated by the attendant by means of the regulating-valve in this branch pipe. The two other branch pipes, *e e*, pass directly through to the inside of the inner cylinder, *h*, called the "still," where the distillation takes place. The inside of this cylinder is divided into a series of compartments by a series of horizontal diaphragms, *i*, pierced with numerous small holes, and through each there is a larger hole fitted with a short tube, *j*, for the passage of steam, the said short tubes extending up to a sufficient height above the upper surface of each diaphragm to prevent the liquid to be distilled, and which may accumulate to some extent on the surface, from running through the steam-apertures.

To the upper end of the still-cylinder is fitted a still-head and neck, *k*, of the usual construction, leading into a suitable worm, *l*, in a condensing-tub, *m*—such as is usually employed in distilleries—and the neck of the still-head *k* is to be provided with a regulating-valve, *n*, to regulate the pressure of the steam within the still-cylinder *h*. Above the still-head there is a supply vat or vessel, *o*, into which the substance to be distilled is placed; and for the purpose of heating such substance preparatory to the introduction of it into the still-cylinder this vat is jacketed and the surrounding space supplied with steam for the purpose by a small branch steam-pipe, *p*, provided with a regulating-valve to be under the control of the attendant. From the bottom of this vat a tube, *q*, extends down through the head of the still and through the upper end or head of the still-cylinder, the said feed-tube being provided with a regulating-valve, *r*, to regulate the supply. A thermometer, *s*, should be provided, with the bulb within the still-cylinder and the index outside of the outer cylinder or jacket, to enable the attendant to observe the temperature within. The lower end of the still-cylinder is provided with a discharge-pipe, *t*, leading into a receiving-vat, *u*, provided with a pump, *u'*, and pipe *v* to lead to another supply-vat, *o'*, like the one *o*, the purpose of this arrangement being to transfer the liquid which passes through the first division, without being distilled, to the second division, which is constructed in all respects like the first, and where this liquid is to be subjected to the like treatment, but at a higher temperature; and so the division may be carried on to any extent, each division being provided with its appropriate worm and condensing-tub.

The liquid to be distilled is first heated in the supply-vat to a preparatory temperature, superheated steam being admitted to the space between the two cylinders and to the inside of the distillery-cylinder, and at a temperature and pressure depending upon the nature of the substance to be distilled and the quality of the required product. The liquid so to be distilled is permitted to flow from the supply-vat into the upper end of the still-cylinder and discharged upon the upper perforated diaphragm, from which it is discharged in a spray, and so it descends from one to the other of the diaphragms, each in succession checking the descent and renewing the spray, and as the liquid thus descends in spray it is acted upon while so subdivided by the superheated steam, and thereby distilled, the superheated steam and vapor of distillation passing up mainly through the short tubes *j*, but sometimes through the smaller perforations, and together pass into and through the head and neck to the condensing-worm, while that portion of the liquid which cannot be distilled at the temperature within this first division descends to the bottom, and thence runs into the receiving-vat *u*, from which it is pumped into the supply-vat of the next division, to be there carried through the same process, but at a higher temperature, which is there obtained by admitting a greater supply of superheated steam, for it will be evident that, assuming the steam to be superheated in the furnace-coil to a temperature a little above that required for effecting the distillation at the highest required temperature, the lower range of temperature required in the other divisions can be obtained by simply reducing the supply and permitting it to expand.

It will be observed that by means of the regulating-valve in the neck of each still-head the pressure within the still-cylinders can be accurately maintained, so that by regulating the discharge and the admission of steam the temperature can be maintained at any desired degree.

The main steam-pipe *b*, if desired, can be provided, as at *x*, with a safety-valve.

Having thus stated the nature or character of my said invention and described and represented the mode of application, I wish it to be distinctly understood that I do not limit my claim of invention to such mode of application, as many changes may be made in the mode of application without changing the mode of operation which I have invented.

What I claim as new, and desire to secure by Letters Patent, is—

1. The distillation of substances by superheated steam applied to the liquid to be distilled while it is in a spray, substantially as and for the purpose specified.

2. The mode of fractional distillation herein described, consisting in the exposure of the liquid to be distilled, in the form of spray, successively to successive portions of superheated steam of gradually-increasing temperatures.

V. B. RYERSON.

Witnesses:
ANDREW DE LACY,
WM. H. BISHOP.